UNITED STATES PATENT OFFICE.

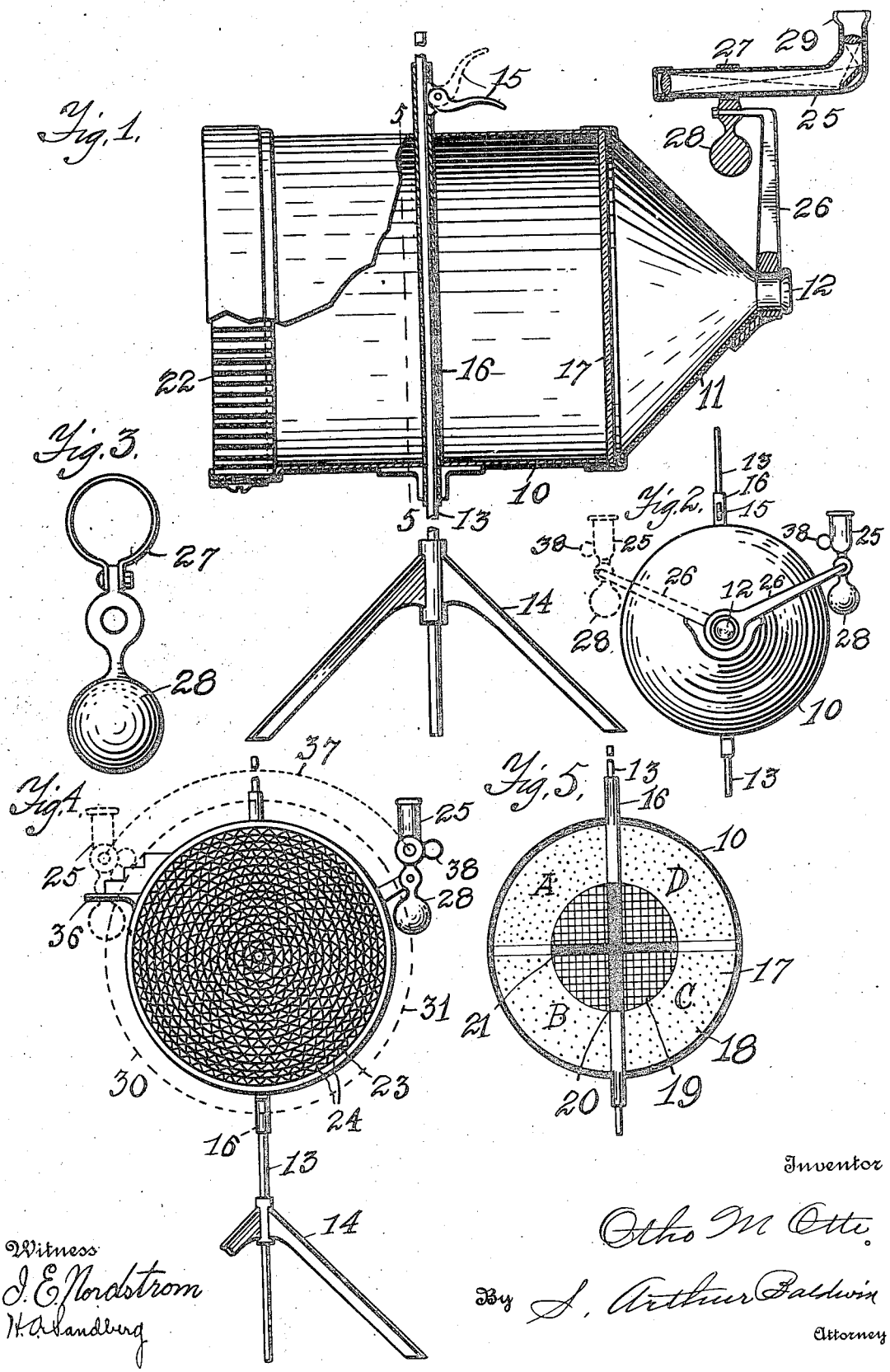

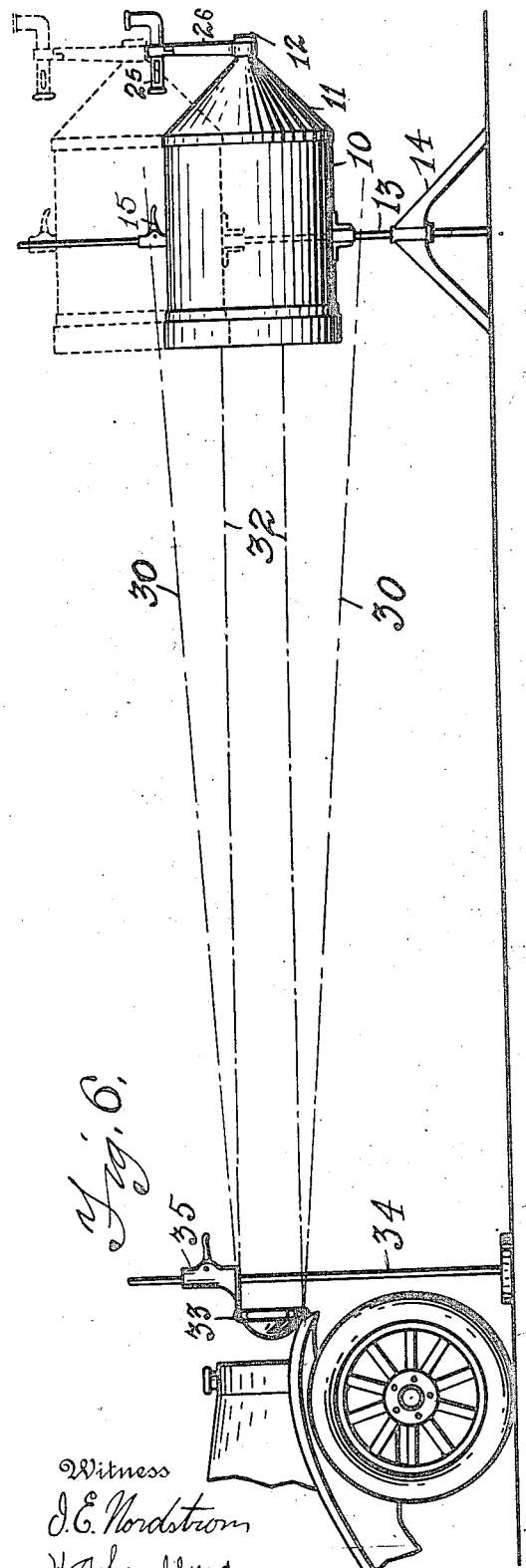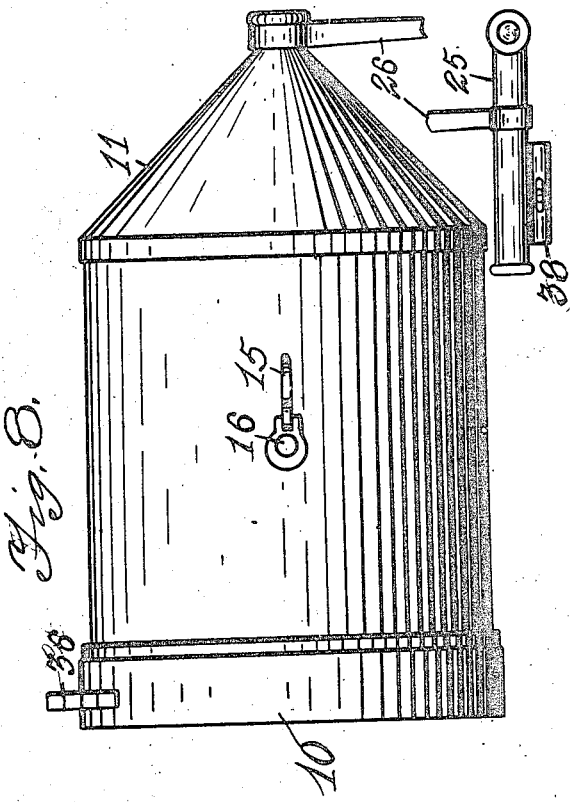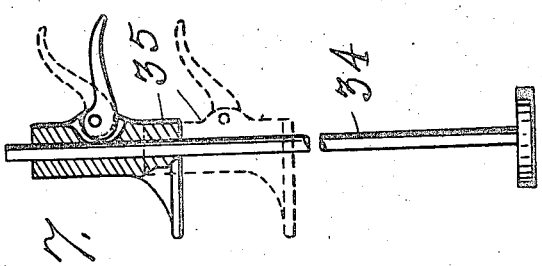

OTHO M. OTTE, OF JAMESTOWN, NEW YORK.

PORTABLE FOCUSING DARK ROOM.

1,266,525.

Specification of Letters Patent. Patented May 14, 1918.

Application filed October 18, 1917. Serial No. 197,354.

*To all whom it may concern:*

Be it known that I, OTHO M. OTTE, a citizen of the United States, residing at the city of Jamestown, in the county of Chautauqua and State of New York, have invented certain new and useful Improvements in Portable Focusing Dark Rooms, of which the following, taken in connection with the accompanying drawings, is a specification.

The purpose of the invention is to provide a portable chamber or dark room with a protecting screen in one end which permits the admission of a shaft of light but shuts out all other rays of light excepting said parallel rays coming from one direction, and providing a peep hole in the other end to enable the operator to center said shaft of light; and second, providing said dark room about midway of its length with a glass centering plate for a light shaft, the outer portions of said glass centering plate having a ground surface and the central portion a gray or darkened surface with a dark lined cross which divides the circular interior of the round dark room into quarters, thereby rendering it more easy to discover any departure from center by the rays of light and enabling the operator to direct a shaft of light from a head light or search light into said dark room in the day light and exactly center the same, means being provided for adjusting the height of the dark room above its supporting surface so that the owner of an automobile who desires to center the shaft of light from each of his head lights at a certain distance from said head lights and at a certain distance above the roadway may accomplish said centering of his head lights in the day time with accuracy and without the need of a darkened room or waiting until the night time; and the invention consists in the novel features and combinations hereinafter set forth and claimed.

In the drawings, Figure 1 is a partial sectional elevation of the portable dark room showing the construction and arrangement of the same as well as the manner of its adjustable support upon a standard. Fig. 2 is a rear elevation of the dark room showing the testing tube swing arm pivotal thereon; and Fig. 3 is a detail elevation of the weight and clamping ring for holding the testing tube in position upon its swing arm. Fig. 4 is a front elevation of the dark room upon its support showing in dotted line the path and scope of the test tube and the line of the shadow light around the shaft of light when said shaft of light is in perfect alinement. Fig. 5 is a sectional view at line 5—5 in Fig. 1 showing the ground glass plate and the cross thereon with the darkened central portion upon which the shaft of light is centered, the center of the dark cross lines being the center of said shaft of light and of the dark room. Fig. 6 is a side elevation of the portable dark room a spaced distance in front of an automobile head light, illustrating the manner of centering the same, the dotted central lines outlining the shaft of light within the dark room and the dotted side lines the shadow light, the adjustment as to height of the dark room upon its standard being shown in dotted outline. Fig. 7 is a side elevation of the measuring standard for the head light and dark room in order to equalize the height. Fig. 8 is a top plan view of the dark room and finder or test tube.

Like characters of reference refer to corresponding parts in the several views.

The numeral 10 designates the dark room which is preferably made in the cylindrical form with a conical shaped rear end 11 and a peep hole 12 in the apex of said rear end. The cylinder 10 is adjustably supported upon a standard 13 and tripod 14 by means of the clamping lever 15 with its cam-shaped inner end which clamps firmly against the standard 13 holding it at any desired height. A tube 16 around the standard 13 extends through the cylinder 10 and is blackened through its central portion, as shown in Fig. 5, to form one of the focusing cross lines.

A plate 17, preferably of ground glass, has its outer portion 18 ground so as to render the same translucent to light and its central portion 19 darkened so as to distinguish between the ground glass portion 18 and the darkened portion 19. Through the darkened portion 19 the tube 16 is also darkened to form the vertical focusing line 20 and a horizontal cross line 21 is also darkened while the tube 16 and cross line 21 throughout the ground glass portion 18 is lightened or made white so as to mark the same through said ground glass portion thereby dividing not only the darkened central portion 19 but the ground glass portion 18 into four equal parts which are marked by the letters A, B, C and D.

A light protecting screen 22 is provided in the front end of the cylinder 10, that is, the end opposite the peep hole 12, filling the whole of said front end. Said screen may be made in different designs but is preferably made of alternate flat strips and V-shaped corrugated strips 24 welded to one another and of sufficient depth to prevent the ingress of false light or other light than the light shaft yet not interrupting the shaft of light as it is directed into the dark room.

A finder or test tube 25 is mounted on an arm 26 which arm is rotatably mounted around the peep hole 12 on the rear end of the dark room. The finder 25 is held in the correct horizontal position by means of the clamping ring 27 which extends around the tube 25 and the weighted bracket piece 28 which hangs pivotally upon the arm 26 as shown in section in Fig. 1, so that in all positions of the arm 25 the weighted bracket piece 28 will hold the tube 25 with its rear end 29 vertical so that the operator can look down into the same through the lens. The arm 26 is of sufficient length so that said test tube 25 is held a spaced distance outside the line of the shadow light as shown by lines 30 in Fig. 6 and 31 in Fig. 4 so that if the operator can see light in the test tube 25 at any part of the arc shown in Fig. 4 then the shaft of light which is indicated by the dotted lines 32 in Fig. 6 is out of center and the position of the head light 33 must be adjusted accordingly, the operator being enabled to see when it is centered by looking through the peep hole 12. Imperfect reflectors for the head lights 33 reflect imperfect shaped shafts of light and may cause upward flares of light that are pear shaped or elliptical shaped, which peculiar shapes are discovered by the operator in looking through the peep hole 12 for such irregular shapes will be shown upon the ground glass and may extend up into the field of the finder or test tube 25. A level 38 is provided on the side of the test tube 25 so that said test tube and the dark room cylinder 10 may be leveled in placing the same before the head light 33.

In order to adjust the dark room 10 to the correct height for the lamp 33, a standard 34 is provided having a clamping gage 35 which may be set at the top of the light shaft 32 at the front of the head light 33, and a series of gage steps 36 are provided on the dark room cylinder 10 so that the desired height can be measured exactly by placing the gage standard 34 with its gage 35 upon the correct step of the series 36.

In operation the dark room is placed at the desired distance from the head light 33 and the owner of the car may look through the peep hole 12 while a mechanic adjusts the head light 33, the car owner directing the adjustment until the shaft of light is centered upon the dark portion 19 of the glass 17. The owner of the light can easily direct the mechanic by calling off the quarters A, B, C or D within which the light encroaches and when so centered the car owner should look within the finding tube 25 and if he can see any light at any portion of the arc 37 he will know at once that his light is not perfectly centered and can adjust the lamp and move the finder back and forth until he corrects the fault and thus perfects the centering of the light.

It is apparent that this simple dark room may be used in any light which is not as strong as the shaft of light from the head light, or will form a simple and convenient centering device when there is entire absence of light.

I claim as new:—

1. A device for determining the center of the field of light of an automobile headlight and the like, comprising a receptacle, a light intercepting screen in one end of said receptacle which admits only parallel light rays, and means in said receptacle for indicating the centering of said parallel light rays.

2. A device of the class described comprising a darkened receptacle, a light intercepting screen in one end of said receptacle having small tubular openings therethrough which admit only the parallel rays of the light shaft, and means for indicating the centering of said light shaft in said receptacle.

3. A device for determining the center of the field of light of an automobile headlight and the like, comprising a dark room, a light intercepting screen in one end of said dark room which admits only parallel rays from a shaft of light, a peep hole in the other end of said dark room, and means in said dark room for indicating the centering of said shaft of light.

4. A device for determining the center of the field of light of an automobile headlight and the like, comprising an adjustable dark room, a light intercepting screen in one end of said dark room which admits only the parallel rays of a light shaft, a peep hole in the other end of said dark room, and intercrossed lines in said dark room dividing the space thereof into fractional portions to assist in centering said light in said dark room.

5. A device of the class described comprising an adjustably supported cylinder, a multiple tubular light screen in one end of said cylinder which admits only the parallel rays of a light shaft to the interior of said cylinder, a peep hole in the other end of said cylinder, a ground glass partition in said cylinder between said peep hole and screen, and crossed lines for said ground glass dividing the same into fractional portions to determine the center of the area of said light shaft in said cylinder.

6. A device of the class described comprising an adjustably supported cylinder, a multiple tubular light screen in one end of said cylinder which admits only the parallel rays of a light shaft to the interior of said cylinder, a peep hole in the other end of said cylinder, a ground glass partition in said cylinder between said peep hole and screen, a darkened central portion in said ground glass and lines crossed at the center to divide the interior of said cylinder into quarter sections both in said darkened center and the ground glass outer portion in said partition to center said shaft of light within said cylinder.

7. A device for determining the center of the field of light of an automobile headlight and the like, comprising a cylindrical dark room, a light intercepting screen in one end of said cylindrical dark room which admits only the parallel rays of a light shaft, a peep hole in the other end of said cylindrical dark room, means for indicating the centering in said dark room of said light shaft, a support for said dark room, and means for adjusting the position of said cylindrical dark room on said support and with respect to the headlight.

8. In a device of the class described, a centering dark room for a shaft of light, a tube extending through said dark room, a standard slidably fitting on said tube, and means on said tube for clamping said standard to adjust the height of said dark room above a supporting surface.

9. A device of the class described comprising an adjustable dark room having means for indicating the centering of a shaft of light, and a test tube movable exteriorly of said dark room to test the accuracy of the centering of said shaft of light.

10. A device of the class described comprising an adjustable dark room having means for indicating the centering of a shaft of light, and a test tube movable in the arc of a circle and mounted beyond the exterior of said dark room to test the accuracy of the center of said shaft of light in different positions in relation to said dark room.

11. A device of the class described comprising an adjustable dark room having means for indicating the centering of a shaft of light, an arm rotatively mounted exteriorly and radially of said dark room, a test tube pivotally mounted on said arm, a weight to hold said test tube in vertical position on said arm in relation to said dark room, and a level on said test tube to level said dark room.

12. A device of the class described comprising an adjustable dark room having means for indicating the centering of a shaft of light, and a gage on said dark room to measure the height of said dark room in relation to said shaft of light.

13. In a device for determining the center of the field of light of an automobile head light, a dark chamber, means to adjustably support the chamber in front of the head light, a screen in the chamber to select parallel light rays entering same, and means in the chamber for indicating the centering of the field of light entering the chamber.

14. In a device for determining the center of the field of light of an automobile head light, a dark chamber, means to adjustably support the chamber in front of the head light, a gage on the dark chamber, adjustable gage means for the headlight, and means in the chamber for indicating the centering of the field of light of the headlight.

15. A device for determining the center of the field of light of automobile head lights and the like, including means for indicating the centering of the field of light from the headlight, and means to support said first named means in front of the headlight.

16. A device for determining the center of the field of light of automobile headlights and the like, including a dark chamber, means to support the chamber in front of the headlight, means to select parallel light rays entering the chamber, and means in the chamber for indicating the centering of the field of light from the headlight.

In testimony whereof I have affixed my signature in the presence of two witnesses.

OTHO M. OTTE.

Witnesses:
 H. A. SANDBERG,
 I. E. NORDSTROM.